United States Patent [19]

Felton

[11] Patent Number: 5,237,519

[45] Date of Patent: Aug. 17, 1993

[54] SEMI-AUTOMATED INSPECTION AND DOCUMENTATION SYSTEM

[75] Inventor: David M. Felton, Palm Bay, Fla.

[73] Assignee: Harris Corporation, Melbourne, Fla.

[21] Appl. No.: 611,848

[22] Filed: Nov. 13, 1990

[51] Int. Cl.⁵ .............................................. G06F 15/20
[52] U.S. Cl. ....................................... 364/552; 364/550
[58] Field of Search ........................ 364/507, 550, 552

[56] References Cited

U.S. PATENT DOCUMENTS

| | | | |
|---|---|---|---|
| 3,711,202 | 1/1973 | Rush et al. | 356/348 |
| 4,344,146 | 8/1982 | Davis, Jr. et al. | 364/552 |
| 4,445,185 | 4/1984 | Davis, Jr. et al. | 358/107 X |
| 4,488,648 | 12/1984 | Claypool | 364/507 X |
| 4,654,583 | 3/1987 | Ninomiya et al. | 356/394 X |
| 4,700,214 | 10/1987 | Johnson | 357/68 |
| 4,720,470 | 1/1988 | Johnson | 437/173 |
| 5,056,765 | 10/1991 | Brandstater | 269/20 |

Primary Examiner—Edward R. Cosimano
Attorney, Agent, or Firm—Evenson, Wands, Edwards, Lenahan & McKeown

[57] ABSTRACT

A workstation for inspecting and documenting an inspection piece includes a frame for holding the inspection piece. The frame has a hollow construction and includes several hollow legs coupled to an underside of the frame for forming an air conduit from the frame through the hollow legs. This allows the frame to slide upon an air cushion formed beneath the legs. A coordinate generator is mounted below the inspection piece and provides coordinate information relative to the inspection piece. A processor is coupled to the coordinate generator for receiving the coordinate information. The processor includes a memory for storing inspection and documentation information for the inspection piece. An operator interface is coupled to the processor for carrying out the inspection and documentation of the inspection piece in accordance with the inspection and documentation information stored in the memory.

21 Claims, 5 Drawing Sheets

SEMI-AUTOMATED INSPECTION AND DOCUMENTATION SYSTEM

BACKGROUND AND SUMMARY OF THE INVENTION

This invention relates to an inspection and documentation system and, more particularly, to an inspection and documentation system for circuit card assemblies and/or other fine mechanical parts or components.

Circuit card assemblies and other fine mechanical components such as finished precision parts require inspection and repair procedures to produce a high-quality product. For example, with respect to the inspection of a circuit card assembly, the component part numbers and component polarities must be verified. Further, with respect to the assembly inspection of the circuit card assembly, the component mounting, solder quality as well as quantity, hardware configurations and markings must also be verified.

As quality standards reach higher levels, as imposed by private industry and the government, an increase in the quantity of documentable defects found in an inspection piece is being required. Further, an increase in the calculation of accurate defect levels and the process control indicators associated with the document defects is also being required.

Prior known systems for inspecting and repairing circuit card assemblies have included a workstation at which the circuit card assembly is mounted on a rigid-path, motorized x-y-z table frame. An operator sits at the workstation and controls the table movements while viewing the circuit card assembly through a stereo microscope. When desiring to view a circuit component, the operator manually searches for and selects that component. The component identification is then read off of the circuit card assembly and compared with a list of part numbers to verify the correct component. This manual search and select system is both tedious and time consuming for the operator Further, when the defects must also be documented, as noted above for governmental or private industry standards, the operator must physically write a discrepancy note which is later transferred to a discrepancy form. Further, check marks must be made beside verified part numbers to eliminate any duplication of effort in the inspection and documentation process. In other words, all of the documentation steps required must be performed manually and are generally performed in separate steps.

There is therefore needed an automated inspection and documentation system allowing a quick location of inspection points and having an integrated documentation system.

These needs are met by the present invention which provides for manual control of an x-y-$\theta$ air-frame table for quick location of inspection points on the circuit card assembly or other inspection pieces. Further, the components and joints to be inspected are automatically identified via software used in the system rather than by manual search and select of the prior art. Further, any defect located is identified and documented in an integrated manner rather than as separate steps in the operation.

The present invention includes a workstation having a manually movable air-frame located on a table top. Mounted in the air-frame is the inspection piece, such as a circuit card assembly or fine mechanical part, to be inspected. Also mounted beneath the test piece on the air-frame is an electromagnetic digitizer. The digitizer operates in conjunction with a cursor fixedly positioned on the table top to provide x-y coordinates. A defect pointer, for example two white light sources converging at a single point fixed with respect to the workstation, allows the operator to manually move the circuit card assembly to align the inspection point with the converging light sources. The operator views the inspection point through a stereo microscope mounted to the workstation above the circuit card assembly. Through the use of the air-frame which forms an air cushion between the air-frame and the table top, the operator can easily slide the inspection piece on the table top to allow easy and quick alignment of the inspection point. The air-frame operates in conjunction with a foot pedal for activating and deactivating the air supply to the frame in a manner so as to allow the operator to cut-off the air flow when desired. This allows the air-frame to settle in a frictionally engaged position on the table top at selected inspection points.

The digitizer tablet and digitizer cursor are coupled with a CPU for providing digitized x-y coordinate information to the processor. The processor includes a memory for storing manufacturing information and part list information for the components on the circuit card assembly to be tested. The CPU further couples with a display monitor and mouse selector for interfacing the operator with the system software which controls the inspection and documentation process.

Other objects, advantages and novel features of the present invention will become apparent from the following detailed description of the invention when considered in conjunction with the accompanying drawings.

BRIEF DESCRIPTION OF THE DRAWINGS

FIG. 1A is a side view of the workstation according to FIG. 1;

DETAILED DESCRIPTION OF THE DRAWINGS

Figure 1:
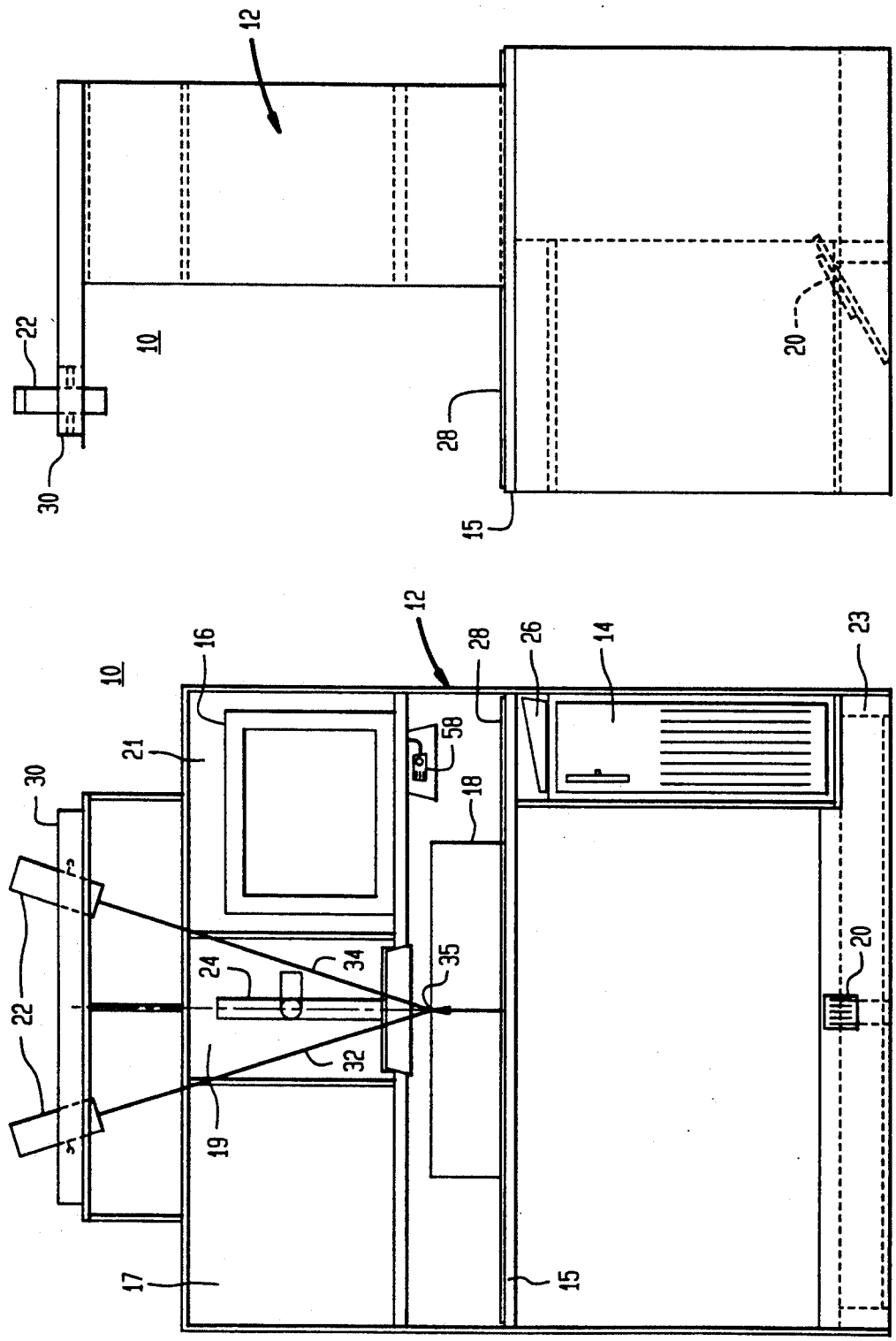
FIG. 1 is a schematic illustration of a workstation according to the present invention.

Referring to FIG. 1, a schematic diagram of a workstation 10 is shown including a console cabinet 12. The console cabinet 12 has a table shelf 15 and numerous compartments, examples of which are indicated at 17, 19 and 21. The console cabinetry 12 may, for example, be formed of a thick wood or formica material. The console 12 includes a bottom frame 23 which, for example, may be formed of 2×4 wood materials.

Located on top of the console table shelf 15 is a glass plate or other suitable material layer 28 upon which an air-frame 18 is supported. A microscope (not shown) is supported above the air-frame 18 via a mounting 24. The microscope allows the operator sitting at the console table shelf 15 to view the inspection or test piece mounted on the air-frame 18.

The console cabinet 12 includes a top cover 30 having mounted thereto a defect pointer 22. As shown in FIG. 1, the defect pointer 22 includes, by way of example, two light sources generating light rays 32 and 34, respectively, which converge at a single point 35 fixed with respect to the glass layer 28. The fixed point 35 is determined such that the inspection piece, when mounted in the air-frame 18, lies in the plane of the fixed point 35. In this manner, the defect pointer 22 illuminates whatever portion of the inspection piece is currently located at the fixed point 35.

The workstation 10 further includes a control system including a computer 14, such as a personal computer having sufficient memory for the inspection and documentation process, coupled with a number of peripherals. For example, a display monitor 16 is located in compartment 21 of the console cabinet 12. A keyboard 26 and mouse 58 are operatively coupled with the computer 14 for providing an operator interface to the system. Further, an electromagnetic digitizer and its associated cursor (see FIGS. 2 and 3) located as part of the air-frame assembly 18 are also coupled with the processor 14. An operator's pedal 20 is provided at the bottom of the workstation 10 for controlling the air supply to the air-frame 18 as will be described later. FIG. 1a shows a side view of the workstation 10 according to FIG. 1.

Figure 2:
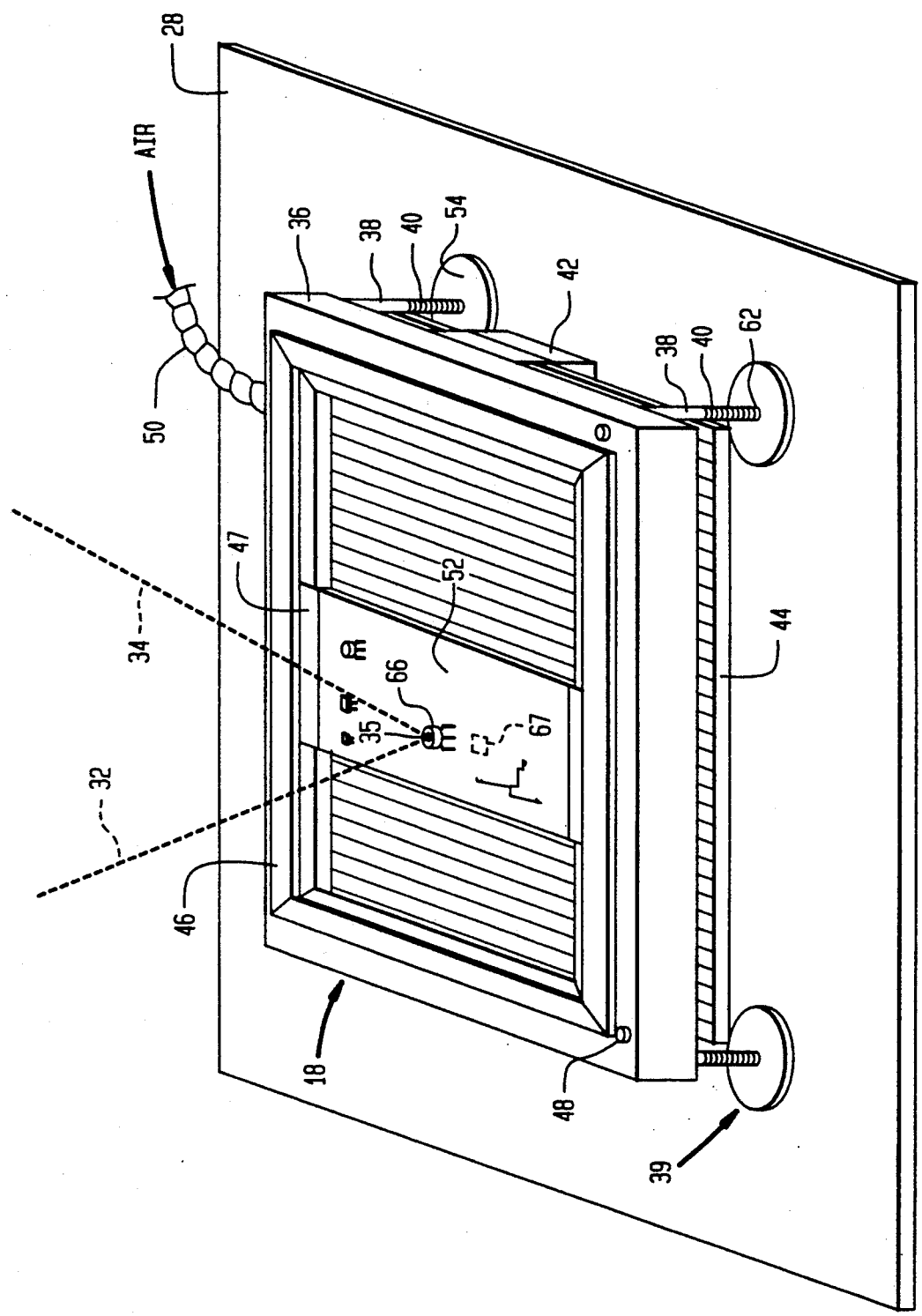
FIG. 2 is a perspective view of the air-frame according to the present invention.

Referring to FIG. 2, the air-frame 18 is shown located upon the glass plate layer 28. The air-frame 18 can, for example, have a rectangular shape. In a preferred embodiment, the rectangular shape is approximately 17×26½ inches, but it is readily understood that the air-frame 18 may be of any dimension which would allow it to operate in accordance with the principles of the present invention. The air-frame 18 has a hollow construction formed of hollow tubing 36 which, for example, may be on the order of 1"×1" square hollow tubing. Coupled to the back side rail of the air-frame 18 is an air hose 50. The air hose 50 supplies air into the hollow tubing 36 of the air-frame 18.

The air-frame 18 is supported via legs, indicated generally at 39, coupled to the bottom surface of the hollow tubing 36. The legs 39 include a hollow screw 40, such as a hollow plastic screw, having an outer plastic tubing sheath 38. The hollow screw and tubing sheath 40 and 38, respectively, are coupled at one end to the bottom surface of the hollow tube 36 forming an air conduit for the air inside of the hollow tube 36 to flow through the leg tubing and hollow screw 38 and 40. The opposite end of the plastic hollow screw 40 and tubing 38 is coupled to a center tap hole 62 formed in a disk 54. The disk 54 may be formed of a metal or other suitable material and is preferably on the order of four-inches in diameter. The center tap hole 62 has an approximately ⅛ inch diameter. By this arrangement, the air supplied to the air-frame 18 via air hose 50 flows through the hollow legs 39 and exits beneath the disks 54. This forms an air cushion between the glass plate layer 28 and the bottom surface of the disk 54 by which the system operator can easily slide the air-frame 18 upon the glass layer 28 into any desired position.

Referring back to FIG. 1, the operator's pedal 20 controls the air supply (not shown) to the air-frame 18 such that by depressing the pedal 20, the air supply is cut off and the air-frame 18 rests in frictional engagement with the glass layer 28 at the position desired by the operator. In this manner, once the air-frame and consequently the inspection piece is located in its desired position, the air supply is cut-off to provide the frictional engagement to prevent unwanted movement of the air-frame.

Referring back to FIG. 2, the air-frame 18 includes a sliding rail mount 46 coupled to the top surface of the hollow tubing 36. The slide rails 46 allow a work holder 47, for holding the inspection piece 52 in the air-frame assembly 18, to move relative to the air-frame. As shown in FIG. 2, an inspection piece such as a circuit card assembly 52 is held by the work holder 47 on the slide rails 46 as part of the air-frame 18. The work holder 47 and slide rails 46 allow the inspection piece 52 to be moved within the air-frame 18 until a desired location is found. Once this position is determined, the inspection piece 52 can be secured at the location by a fastening device (not shown) such as screws or clamps.

An electromagnetic x-y digitizer 44 is mounted to the air-frame 18 beneath the rectangular hollow tubing 36. Digitizer clamps 42 extend from the bottom surface of the hollow tubing 36 for holding the x-y digitizer 44. The digitizer 44 can be, for example, any commercially available digitizer such as the Hipad, Model No. 9018, manufactured by Houston Instruments. The dimensions of the digitizer 44 should be such that the inspection piece 52, wherever mounted in the air-frame 18, is located above the digitizer 44. For example, in a preferred embodiment, the Hipad digitizer having 12"×18" dimensions is located beneath the hollow tubing 36 of the air-frame 18.

The digitizer 44 operates in conjunction with a cursor 67 which is fixedly mounted on the glass plate 28. By sliding the air-frame 18 and hence the digitizer tablet 44 over the cursor 67, various x-y coordinates may be obtained. In order to do so, buttons 48 are provided on the top surface of the hollow tubing 36. The buttons 48 are coupled to the digitizer tablet 44 and, when activated, provide the x-y coordinates of the digitizer tablet 44 with respect to or relative to the fixed digitizer cursor location 6 and hence the inspection point.

Further as shown in FIG. 2, the light rays 32 and 34 from the defect pointer 22 converge at a fixed point 35 located in vertical alignment with the digitizer cursor 67. In this manner, when an inspection point, such as component 66 as shown in FIG. 2, coincides with the fixed defect point 35, its x-y coordinates with respect to the inspection piece, in this case circuit card assembly 52, can be determined by activating the digitizer button 48.

Figure 3:
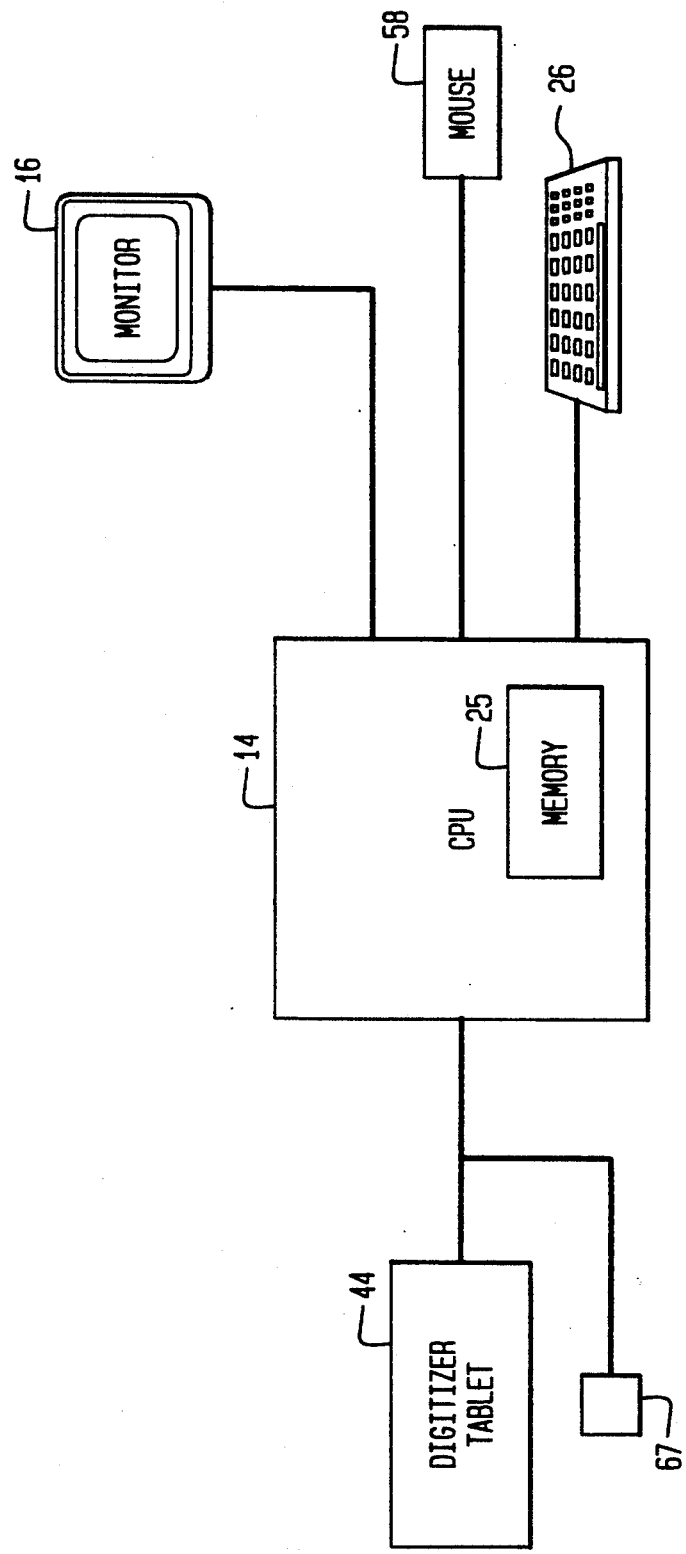
FIG. 3 is a schematic diagram of the computer system used in the present invention.

Referring to FIG. 3, a block diagram of the inspection and documentation control system is shown. The system includes a CPU 14 having memory 25. The CPU 14 may be a personal computer equipped with dual serial communication ports. These ports communicate with a number of peripherals such as display monitor 16, mouse 58 and keyboard 26. Further, the digitizer tablet 44 and cursor 67 system are coupled to the CPU 14. The digitizer system optimally provides 0.010 inch accuracy. The system software operates in the CPU 14 to control the inspection and documentation system. The system software provides menu prompts on the display monitor 16 by which the operator, using the mouse control 58, can select the desired information. The data flow through the system is shown with reference to the data flow diagram of FIG. 4.

The operation of the system will now be described with respect to the inspection and documentation of a circuit card assembly. It is understood by one skilled in the art that the inspection and documentation can be carried out for any type of inspection piece in accordance with the principles of the invention.

Figure 3A:
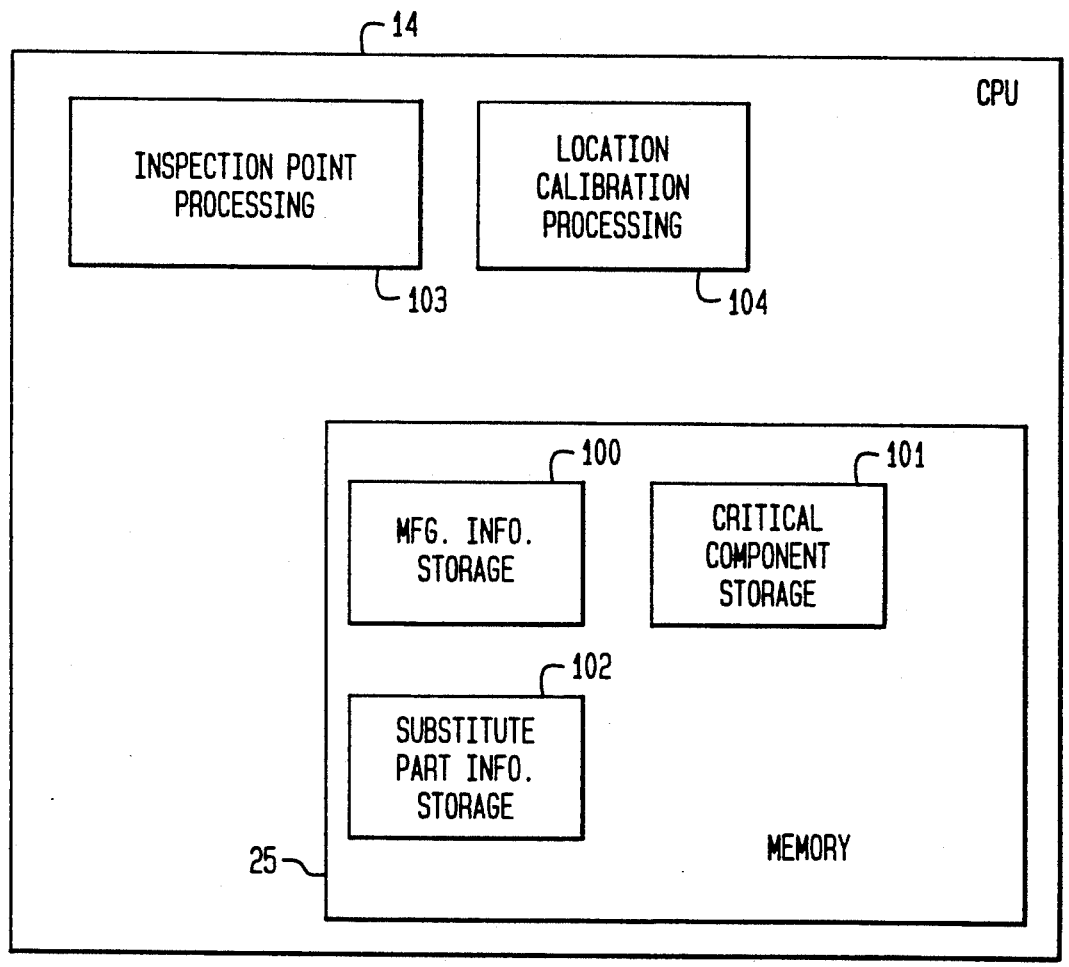
FIG. 3A is a block diagram of the CPU shown in FIG. 3.

Referring to FIG. 3A, prior to inspecting a circuit card assembly, a quality engineer supplies manufacturing information 100, and computer aided design (CAD) concerning the circuit card assembly to the memory 25 of the CPU 14. This information can be accepted directly from a manually-created ASCII text file for supplying the manufacturing information. The system software for the CPU 14 can calculate solder joint locations 103 based upon the supplied manufacturing information and CAD data.

Further, the quality engineer also supplies the system software with a list of valid substitute part numbers 102 and critical components on the circuit card assembly. The critical components 101 are defined as those components whose polarity or function cannot be checked/sensed at testing of the circuit card assembly.

The system software for the inspection and documentation system is menu driven. All menu selections are made using an operator input device such as the mouse 58. The software provides prompts on the display monitor 16 to the operator to identify the proper circuit card assembly currently being inspected. After identifying the circuit card assembly and calibrating the location of the circuit card assembly 104 with respect to the digitizer in the air-frame assembly 18, the inspection process begins. The calibrating step includes the steps of selecting at least three inspection points; activating the digitizer at each of said inspection points; and calculating in the processor the inspection piece position in the airframe based on the coordinate information of said three inspection points in accordance with the stored manufacturing information for the inspection piece. Also, when the inspection piece is a circuit card assembly, the CPU stores: solder joint data for the circuit card assembly; drafting and assembly combined data for the circuit card assembly; critical component data for the circuit card assembly; and substitute part number data for the circuit card assembly.

Inspection of the circuit card assemblies is composed of three tasks: critical component verification, component verification, and assembly inspection. Critical component verification and component verification include verifying the component part numbers and their polarities. The assembly inspection task consists of inspecting the component's mounting, solder quality/quantity, hardware configurations, markings, etc.

During the critical component verification task, the system software guides the operator to move the frame assembly until the defect pointer is aligned and coincides with a critical component. The guidance procedure can direct the operator by displaying a current-position cursor and a target-position cursor on the display monitor 16. The operator then moves the frame assembly such that the current and target position cursors align on the display monitor. Upon alignment, the part number information is displayed on the monitor 16 and verified. The operator may request display of substitute part numbers if desired.

In order to verify component part numbers, the operator randomly selects components by moving the airframe assembly until the defect pointer is aligned with a selected component. Upon alignment, the part number information is displayed and verified. Again, the operator may request the display of substitute part numbers if desired.

In order to document a defect during the critical component verification or component verification tasks, the operator selects an option from the menu displayed on the display monitor 16. For example, if a defect is noted, an "incorrect" option can be chosen. A subsequent menu, listing the defect types possible, is then displayed on the monitor 16. The operator selects the appropriate defect type and continues his inspection.

The assembly inspection stage requires the operator to scan the circuit card assembly until a defect is observed. The operator aligns the defect pointer with the defect and describes the defect by using the mouse 58 to select a defect category and a defect description from the menus provided on the display monitor 16. If the defect is not listed on the menus, then the operator identifies the defect by "typing" a unique description by "selecting" characters arranged in alphabetical order from a "keyboard" displayed on the monitor using his mouse 58. It is readily understood, however, that in other embodiments, the keyboard 26 could be used to type in a different defect description. The assembly inspection process is repeated until all defects are documented.

The inspection and documentation system of the present invention automates several of the processes involved in circuit card assembly inspection: component reference designators and solder joint numbers are automatically identified; defect descriptions of common defect types are automatically written at the touch of a mouse button; the process of searching for valid substitute part numbers for a specified component is automated; defects are automatically grouped by defect type; a defect documentation report is automatically generated; defects are automatically summarized and formatted for direct input into another system which can summarize the daily defect data; and data required for making calculations in accordance with government and private industry defect standards is automatically supplied in electronic form for input into another system which can perform the calculations for each inspection piece tested.

As a result of the workstation and system software, processes requiring control corrections can be identified more accurately and timely, defect write-up formats are standardized, distractions from inspection caused by excess paperwork and time-consuming search tasks are reduced and the throughput of the circuit card assembly inspection is increased.

Figure 4:
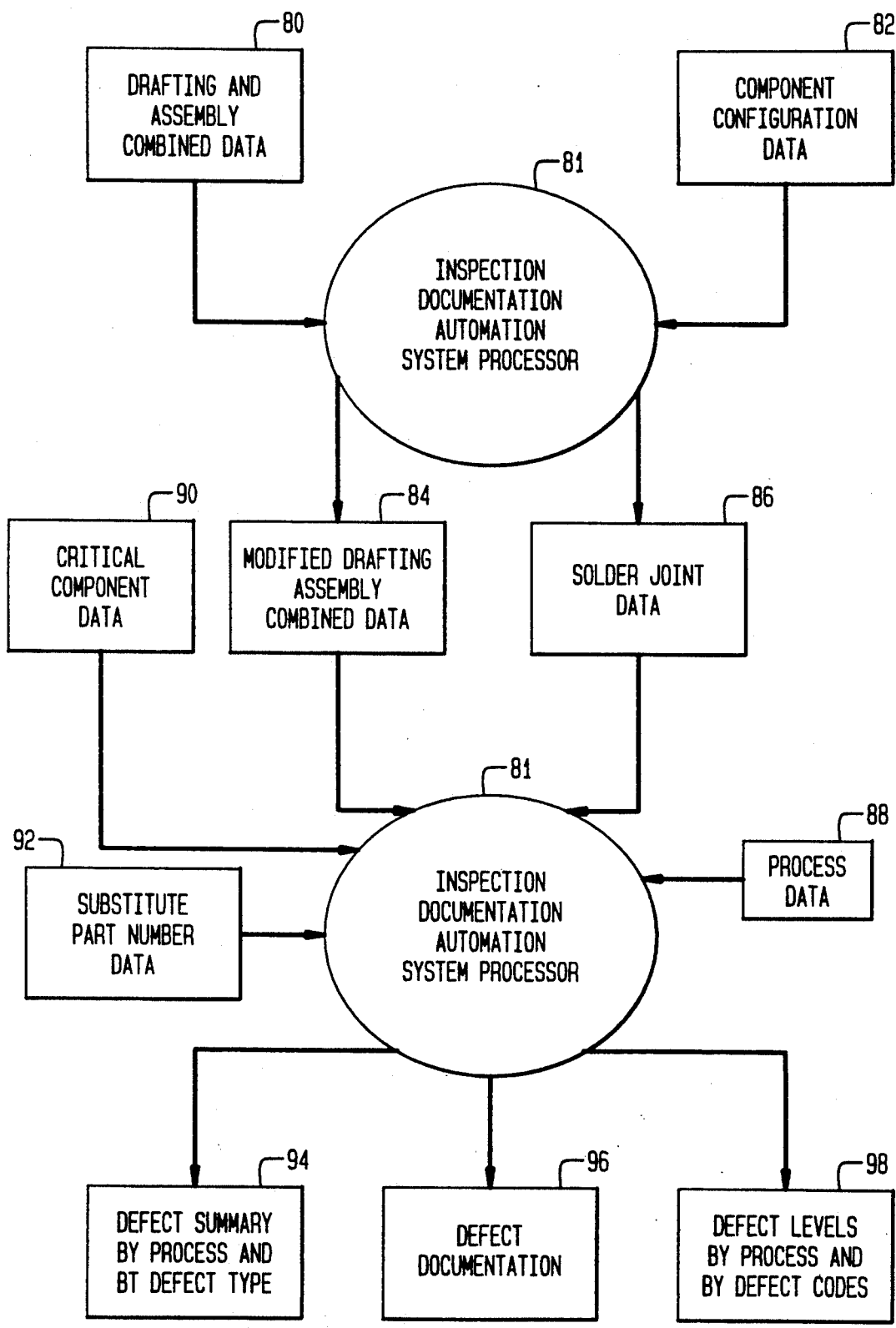
FIG. 4 is a diagram describing the data flow in accordance with the software operating on the CPU of the present invention.

As shown in the data flow diagram of FIG. 4, drafting and assembly combined data 80 is provided to the system software 81. Further, component configuration data 82 is also supplied to the system software 81. The system software then generates modified drafting assembly combined data 84 and solder joint data 86 for the specific circuit card assembly being inspected.

The modified drafting assembly combined data 84, solder joint data 86, process data 88, critical component data 90, and substitute part number data 92 are all input to the system software 81. The operator then performs an inspection and documentation by manually moving the air-frame and selecting inspection points in accordance with the software prompts and the current task being performed in the inspection and documentation process. The system software 81 then provides a defect summary 94 by process and by defect type, a defect documentation 96, and defect levels 98 by process and by defect codes as output for further processing.

The workstation of the present invention thus allows defect location identification and defect documentation systems to be integrated into one semi-automated inspection and documentation system.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A workstation and documenting an inspection piece, comprising:
   a frame for holding the inspection piece, said frame having a hollow construction and including a plurality of hollow legs coupled to an underside of said frame forming an air conduit from said frame through said hollow legs allowing said frame to slide upon an air cushion formed beneath said legs;
   a coordinate generator mounted below the inspection piece providing coordinate information relative to said inspection piece;
   a processor coupled to said coordinate generator receiving coordinate information, said processor including a memory for storing inspection and documentation information for the inspection piece; and
   an operator interface coupled to said processor for carrying out the inspection and documentation of the inspection piece in accordance with said inspection and documentation information stored in said memory.

2. A workstation according to claim 1, further comprising:
   a defect pointer mounted to the workstation identifying a fixed point with respect to the workstation, said fixed point being located in a plane of the inspection piece in said frame; and
   wherein said coordinate generator is a digitizer including a digitizer tablet fixed mounted to said frame and a digitizer cursor located in a fixed position relative to said frame, said fixed position being in a substantially vertical alignment with said fixed point of said defect pointer.

3. A workstation according to claim 2, further comprising:
   a plate layer located below said plurality of legs between which the air cushion is formed.

4. A workstation according to claim 3, wherein said inspection piece is a circuit card assembly.

5. A workstation according to claim 3, wherein said defect pointer includes:
   a first light source mounted to the workstation and providing a first light path; and
   a second light source mounted to the workstation and providing a second light path, said first and second light paths converging at said fixed point.

6. A workstation according to claim 5, wherein said first and second light sources are white light sources.

7. A workstation according to claim 3, wherein said plurality of hollow legs each comprise:
   a hollow screw;
   an outer tubing formed around said hollow screw, said screw and tubing coupling at one end to the underside of said frame for forming the air conduit; and
   a leg base having a tap hole through said leg base, said tap hole receiving the other end of said screw and tubing to allow the air supply to flow out a bottom surface of said leg base.

8. A workstation according to claim 7, wherein said leg base is a disk having a centrally located tap hole.

9. A workstation according to claim 7, wherein said frame has a rectangular construction formed of square hollow tubing.

10. A workstation according to claim 3, further comprising:
    an air hose supplying air to said frame for forming the air cushion; and
    an air supply control device for stopping the air supply and allowing said legs to rest in a frictional engagement on said plate layer.

11. A workstation according to claim 10, wherein said frame further comprises:
    a slide rail mounting disposed on its top surface by which the inspection piece is slidable to any position within said frame.

12. A workstation according to claim 11, wherein said frame further comprises:
    mounting brackets extending from beneath said frame for mounting said digitizer tablet; and
    at least one switch mounted on said frame and coupled to said coordinate generator for activating said coordinate generator to provide the coordinate information to said processor.

13. A workstation according to claim 3, wherein said operator interface includes:
    a display monitor coupled to said processor; and
    a mouse device coupled to said processor for providing operator input to said processor.

14. A workstation according to claim 13, wherein said processor and memory further comprises:
    means for storing manufacturing information concerning the inspection piece;
    means for calculating inspection points on the inspection piece based on the stored manufacturing information;
    means for storing substitute part information for the inspection piece;
    means for storing critical components of the inspection piece; and
    means for calibrating a location of the inspection piece in said frame relative to said coordinate generator before beginning the inspection and documentation process.

15. A workstation according to claim 14, wherein said inspection piece is a circuit card assembly.

16. A method for inspecting and documenting inspection points on an inspection piece, the method comprising the steps of:
    storing manufacturing information concerning the inspection piece in a processor;
    calculating in the processor inspection points on the inspection piece in accordance with the stored manufacturing information;
    storing relevant inspection piece information concerning the inspection piece in the processor;
    locating the inspection piece in an air-frame at a workstation;
    calibrating a position for the inspection piece in said air-frame relative to a fixed location;
    moving the air-frame such that one inspection point is in vertical alignment with said fixed location;
    observing said inspection point through a microscope;

inputting defect information to said processor in accordance with said observation step; and providing from said processor defect documentation information for the inspection piece.

17. A method according to claim 16, wherein the step of moving the air-frame comprises the steps of:

manually sliding the air-frame on an air cushion formed beneath legs of said frame;

vertically aligning the one inspection point over said fixed location; and deactivating an air supply to said air-frame allowing the legs of said frame to frictionally rest on a plate layer.

18. A method according to claim 17, wherein the step of inputting defect information comprises the steps of:

activating a digitizer to provide coordinate information of the inspection point relative to the fixed location to said processor; and operating a peripheral device coupled to said processor to select menu options displayed on a monitor coupled to the processor for inputting the defect information.

19. A method according to claim 18, wherein the step of calibrating comprises the steps of:

selecting at least three inspection points;

activating the digitizer at each of said inspection points; and calculating in the processor the inspection piece position in the air-frame based on the coordinate information of said three inspection points in accordance with the stored manufacturing information for the inspection piece.

20. A method according to claim 19, wherein the inspection piece is a circuit card assembly and the step of storing relevant inspection piece information comprises the steps of:

storing solder joint data for the circuit card assembly;

storing drafting and assembly combined data for the circuit card assembly;

storing critical component data for the circuit assembly; and storing substitute part number data for the circuit card assembly.

21. A method according to claim 19, wherein the inspection piece is a circuit card assembly and the step of providing from said processor defect documentation information comprises the steps of:

providing defect summary information by process and defect type; and providing defect level information by process and defect codes.

* * * * *